United States Patent [19]

Warner et al.

[11] Patent Number: 5,341,392
[45] Date of Patent: Aug. 23, 1994

[54] LONGITUDINAL DISCHARGE LASER ELECTRODES

[75] Inventors: Bruce E. Warner, Livermore; John L. Miller; Earl R. Ault, both of Dublin, all of Calif.

[73] Assignee: The United States of America as represented by the United States Department of Energy, Washington, D.C.

[21] Appl. No.: 640,174

[22] Filed: Jun. 22, 1984

[51] Int. Cl.$^5$ .......................... H01S 3/22; H01S 3/03
[52] U.S. Cl. ........................ 372/62; 372/33; 372/56
[58] Field of Search .................. 372/33, 34, 56, 61, 372/62, 703; 350/276 SL, 442; 330/4.3; 312/33, 62, 156; 359/345

[56] References Cited

U.S. PATENT DOCUMENTS

| | | | |
|---|---|---|---|
| 2,670,656 | 3/1954 | Braymer | 350/276 SL |
| 3,699,471 | 10/1972 | Mulready et al. | 350/276 SL |
| 3,934,211 | 1/1976 | Sucov et al. | 372/56 |
| 4,025,818 | 5/1977 | Giguere et al. | 330/4.3 |
| 4,106,856 | 8/1978 | Babish | 350/442 |
| 4,217,026 | 8/1980 | Radovich | 350/276 SL |
| 4,287,484 | 9/1981 | Wang et al. | 372/34 |

FOREIGN PATENT DOCUMENTS

| | | | |
|---|---|---|---|
| 0039082 | 3/1983 | Japan | 372/34 |

OTHER PUBLICATIONS

Leinert et al, "Stray Light Suppression . . . Experiments", Mar. 1974, pp. 556–564, Appl. Opt., vol. 13, No. 3.

Butler, "Efficient Baffles for Laser . . . Experiments", Oct. 15, 1982, pp. 3617–3618, Appl. Opt., vol. 21, No. 20.

*Primary Examiner*—Nelson Moskowitz
*Attorney, Agent, or Firm*—Miguel A. Valdes; Roger S. Gaither; William R. Moser

[57] ABSTRACT

The improved longitudinal discharge laser electrode with IR baffle includes an electrode made up of washers spaced along the laser axis in order to form inter-washer spaces for hollow cathode discharge to take place and for IR radiation to be trapped. Additional IR baffles can be placed between the electrode ann the window.

8 Claims, 2 Drawing Sheets

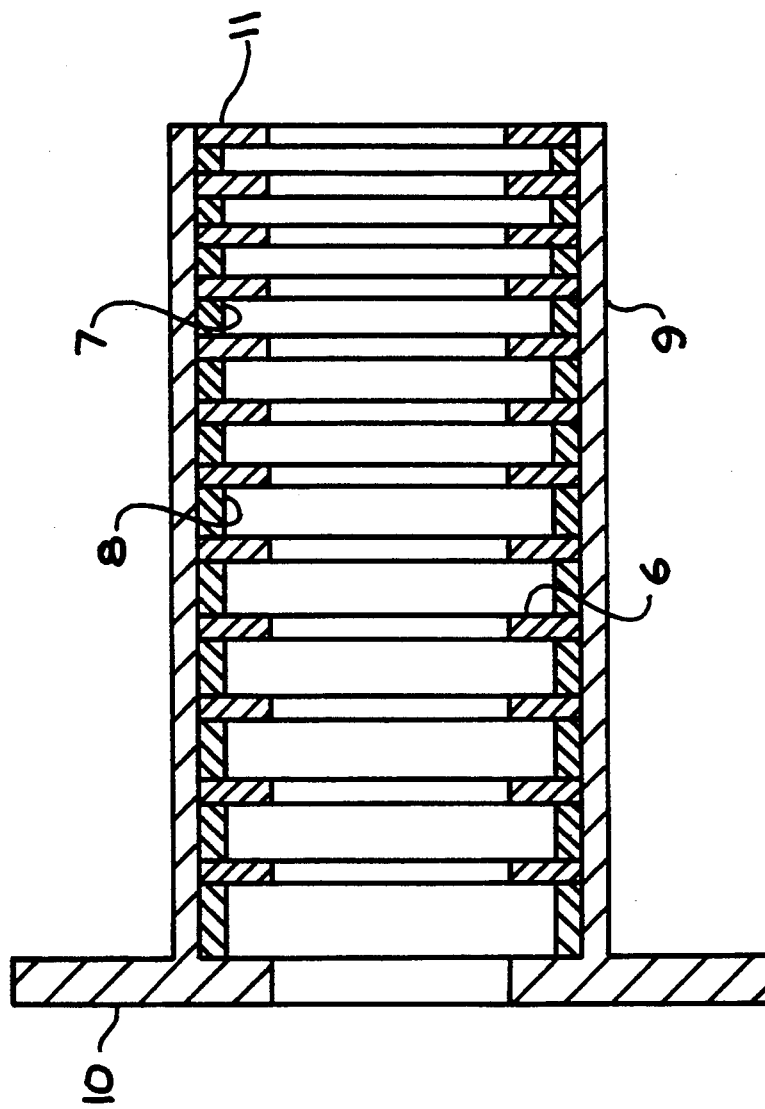

LONGITUDINAL DISCHARGE LASER ELECTRODES

FIELD OF THE INVENTION

The United States Government has rights in this invention pursuant to Contract No. W-7405-ENG-48 between the United States Department of Energy and the University of California for operation of the Lawrence Livermore National Laboratory.

CROSS-REFERENCE TO RELATED APPLICATION

Related patent application Ser. No. 640,173 (DOE Case No. S-60,941) is filed on the same day as the present patent application and is assigned to the same assignee.

BACKGROUND OF THE INVENTION

The present invention relates to improved longitudinal discharge laser electrodes, and more particularly, it relates to improved electrodes for metal vapor lasers.

Longitudinal discharge lasers have a number of uses. Specifically for metal vapor lasers, applications are known in uranium isotope separation using copper vapor and in medical applications using gold vapor. Other metal vapor laser media include lead and borium. An example of the use of copper vapor lasers to pump dye lasers for uranium isotope separation is described in UCRL-88040 on *Atomic Vapor Laser Isotope Separation* by James I. Davis. This paper describes work done as of the Fall of 1982 with individual copper vapor laser pumped dye laser oscillators run over 1,000 hours in accumulated time. This lifetime test not only illustrates that copper vapor lasers act usefully as dye laser pump sources, but also that copper vapor laser lifetime is an important issue for atomic vapor laser isotope separation. Since the copper vapor lasers had to be stopped several times to replenish the copper supply, the copper vapor laser design employed in the 1000 hour life test differs from the design needed for an isotope separation plant.

In the past, a metal vapor laser electrode was typically a single solid cylinder. In the region between the two electrodes an electrical discharge excites the metal vapor so that it reaches an energy level from which it can lase. Laser light of the appropriate wavelength can traverse this region of excited metal vapor and gain energy through stimulated emission. During the electrical discharge between the two electrodes sputtering takes place from the electrodes. This sputtering from the glow discharge of these prior art electrodes results in a limited electrode lifetime due to wear, a formation of damage centers for hollow cathode discharge to take place leading to further damage, and contamination of wicks if they are being used as the metal vapor source. Weld lines for these solid cylindrical electrodes have also been damage centers.

Past metal vapor laser electrode designs are shown in U.S. Pat. No. 3,654,567 to Hodgson and in U.S. Pat. No. 4,247,830 to Karras, et al. Hodgson's FIG. 1 displays a combined electrode-wick design where each electrode is a single material piece across the bottom of the laser at each end. Hodgson's FIG. 2 shows single-piece prior art cylindrical electrodes completely inside of the tube containing the discharge. Karras, et al.'s FIG. 1 reveals the prior art design where part of the single-piece cylindrical electrode is outside the tube which contains the plasma. In this configuration, the strong discharge electric field passing from outside to inside the tube containing the discharge damages the tube with resulting hollow cathode discharge leading to further damage.

SUMMARY OF THE INVENTION

It is an object of the invention to provide a longer-lived electrode for longitudinal discharge lasers.

Another object is to utilize the hollow cathode discharge effect as the stable main discharge in a longitudinal discharge laser instead of having the hollow cathode discharge as a source of damage in a predominantly glow discharge.

A further object is to decrease the flow of infrared radiation from the discharge to exterior parts of the laser, especially the windows.

In brief, the invention relates to improved electrodes for longitudinal discharge lasers and includes an electrode segmented into a plurality of segments, each completely enclosing a path about the axis of the laser, with the segments spaced apart along the axis of the laser. The space between the segments provides a stable site for hollow cathode discharge, and the plurality of segments form a baffle to infrared radiation escaping the discharge region of the laser. Non-conducting baffles may be added to extend out in the region between the electrode and the window.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

FIG. 2 is a cut-away view of a longitudinal discharge laser electrode according to the present invention.

DETAILED DESCRIPTION OF THE INVENTION

Figure 1:
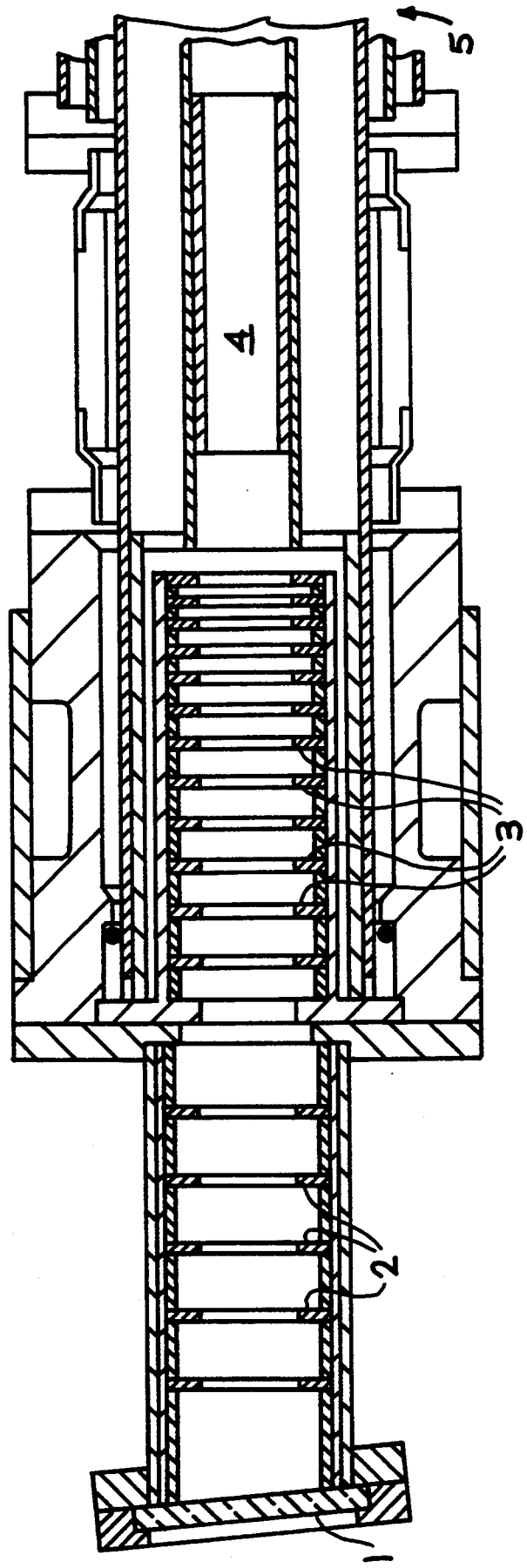
FIG. 1 is a perspective view with a cut-away showing the interior of a metal vapor laser end.

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Referring now to FIG. 1, there is shown the end of a metal vapor laser. The end of the laser comprises a window 1, IR baffles 2, electrode 3, and wick 4. Past the wick 4 is the laser gain region 5 which extends to the wick on the other end of the laser. The ends of the metal vapor laser are typically the same design. While the dimensions of components readily scale, the specific embodiment shown is for a copper vapor laser producing a 4 cm diameter laser beam. From window 1 to electrode 3 is 20.3 cm. The electrode 3 is 7.6 cm long. The space between the electrode 3 and the wick 4 is 5.1 cm. The wick 4 is 15.2 cm long, and the distance between the wicks which comprises the laser gain region 5 is 86.4 cm. The window 1 is of a material transmitting at the wavelength of the laser beam; here the material is quartz. The IR baffles 2 are made of a non-conducting material such as quartz, pyrex, or ceramic. The choice here is quartz. The IR baffles must absorb in the infrared. The IR baffles have an interior diameter of 4.5 cm and an outer diameter of 6.5 cm yielding a ring of one centimeter in radical thickness. The cylindrical height of the ring is 0.1 cm. These rings are spaced apart along the laser axis at 1 cm intervals.

The electrode 3 is shown in place in the laser in FIG. 1 and by itself in FIG. 2. Each electrode element 6 is a ring of interior diameter 4.45 cm, outer diameter 5.71 cm and cylindrical height 0.05 cm. The spacings between the electrode rings may vary from less than 0.1 cm to approximately 0.6 cm so that there is a well defined hollow cathode available to the discharge over the buffer gas pressures and mixtures encountered in typical laser operation. In practice the discharge operates from the first or second annulus, rarely extending to the furthest annuli. This guarantees that the discharge cathode is well defined spatially. The advantage of the hollow cathode is discharge stability and containment of sputtered cathode materials. These electrode elements should be chosen from a material that does not poison the wick, or at least does so slowly, since electrode material is sputtered onto the wick during operation. The electrode material chosen here is tungsten. An advantage of the present invention is that these thin electrode elements may be made by stamping out the parts. Stamping is a less expensive process than bending and welding a sheet of electrode material as in the prior art. Also, the prior art welds tended to be damage centers. The short spacer rings 7 and the long spacer rings 8 are a conductor such as copper or stainless steel. Copper is considered the best choice since any sputtering will just add to the copper in the environment instead of introducing a possible wick poison. The spacer ring interior diameter is 5.38 cm and the outer diameter is 5.71 cm. The cylindrical height is 0.3 cm for the short spacer rings and 0.6 cm for the long spacer rings. The retaining cylinder 9 and electrode base 10 are made of a conducting material, here copper. The retaining ring 11 is also made of a conductor, here stainless steel.

In operation, the above-described copper vapor laser produces a pulsed laser beam at 5 KHz. The laser current pulse width is 300 nsec with a 1,000 ampere peak current. The partial pressure of copper in the laser gain region 5 is approximately 0.1 Torr while the neon buffer gas partial pressure may be run anywhere in the range 20–50 Torr. The spaces between the interior most of the electrode elements form sites for hollow cathode discharge to take place in a stable manner. The electrode material is still subject to sputtering but the damage to electrodes is minimized since the impedance of the main discharge in the present invention is on the same order as a hollow cathode discharge in an electrode damage site. In addition, as electrode material is lost in the first few electrode elements the hollow cathode discharge can simply retreat to the next inter-electrode element spaces and thus continue stable laser operation for a prolonged period of time.

Improved control of the heat flow from between the electrodes on each end of the laser is provided by operation of the present invention. The electrode elements 3 serve as infrared baffles. Heat in the form of infrared (IR) radiation escapes from the central portion of the laser toward the ends. If the IR radiation is propagating sufficiently off the laser axis it strikes material along the walls of the laser. The plurality of electrodes in the present invention provide a trap to stop IR radiation striking the electrode elements directly or in reflection from the wall before striking the electrode element. If added IR control is desired, the IR baffles 2 control the IR radiation in a similar manner to the electrode elements. Since the IR baffles take no part in the discharge and are not then damaged in the process, they need not be made of a conductor. The spacing of the IR baffles is chosen so that an IR ray that just clears the next interior-most IR baffle and reflects from the laser wall will strike the next exterior-most baffle. This control of IR radiation means that less IR radiation strikes the window causing heating of the window. A heated window changes in shape and index of refraction in a manner which in effect forms a long focal length lens. Such a focusing effect can cut the power out of a laser chain by up to half.

Therefore, the present invention provides for improved, efficient, long-lived discharge laser operation. The electrodes according to the present teachings provide stable sites for hollow cathode discharge to be used in a constructive manner instead of as a damage mechanism as in the prior art. Also, the multiple spaces between electrode elements provide successive new sites for hollow cathode discharge, thus greatly extending the life of the laser. The IR baffling provided by the electrode elements, and if present the separate IR baffles, decrease window heating.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An improved longitudinal discharge laser electrode, comprising:
    a longitudinal discharge laser having a discharge region and a window on each end spaced apart and centered along an axis;
    an electrode on at least one end between the discharge region and the window on the at least one end, the electrode comprising a plurality of discrete sections spaced apart to produce a substantially hollow cathode discharge along the axis with the axis running centrally through each of the discrete sections.

2. An improved longitudinal discharge laser electrode as in claim 1, wherein the longitudinal discharge laser is a metal vapor laser.

3. An improved longitudinal discharge laser electrode as in claim 2, wherein a lasing medium is chosen from the group of metals consisting of copper, gold, lead and barium.

4. An improved longitudinal discharge laser electrode as in claim 3, wherein the lasing medium is copper.

5. An improved longitudinal discharge laser electrode as in claim 1, wherein at least one of the inter-section spaces closer to the discharge region than to the window are narrower than at least one of the inter-section spaces farther from the discharge region than from the window.

6. An improved longitudinal discharge laser electrode as in claim 1, wherein the discrete sections are annular in shape.

7. A method for improving longitudinal discharge lasers, comprising:
   providing a path for laser light to move along an axis of a longitudinal discharge laser;
   providing at least one electrode made of a plurality of discrete annular sections, the sections enclosing and being centered on the axis;
   forming a discharge at the at least one electrode comprising a hollow cathode discharge.

8. An improved longitudinal discharge laser electrode with self-baffling and external baffles, the apparatus comprising:
   a longitudinal discharge laser having a discharge region and a window on each end spaced apart and centered along an axis;
   an electrode on at least one end between the discharge region and the window on the at least one end, the electrode comprising a plurality of discrete electrode sections spaced apart to produce a substantially hollow cathode discharge along the axis with the axis running centrally through each of the discrete electrode sections;
   external baffles on at least one end between the electrode and the window on that end, the external baffles comprising a plurality of discrete baffle sections spaced apart along the axis with the axis running centrally through each of the discrete baffle sections.

* * * * *